Patented Aug. 26, 1952

2,608,548

UNITED STATES PATENT OFFICE 2,608,548

N-CARBOANHYDRIDES OF ALPHA AMINO ACIDS AND POLYAMIDES

Charles W. Tullock, Wilmington, Del., assignor to E. I. du Pont de Nemours and Company, Wilmington, Del., a corporation of Delaware No Drawing. Application June 17, 1949, Serial No. 99,853

7 Claims. (Cl. 260—78)

This invention relates to new condensation polymers. More specifically it relates to new alpha-amino acid polyamides.

Curtius, J. prakt. Chem. 125, 211–302 (1930) reported the preparation of the N-carboanhydride of DL-norvaline (alpha-amino-n-valeric acid) by a complicated procedure involving the preparation of n-propylmalonic azide acid and its subsequent thermal decomposition to a purported mixture of the N-carboanhydride and the polymeric anhydride of alpha-amino-n-valeric acid. This report is, however, erroneous, since the N-carboanhydride of DL-norvaline (prepared by the reaction of DL-norvaline with phosgene in anhydrous diethyl ether) is a white crystalline material melting at 66° C. instead of the 161° C. reported by Curtius. The polymer prepared therefrom, e. g. by the methods of MacDonald Ser. No. 778,031 and Ser. No. 778,032, filed October 24, 1947 and Ser. No. 766,457, filed August 5, 1947, gives a white, high molecular weight polymeric norvaline, whereas the material reported by Curtius to be a norvaline polymer is a yellow brown vitreous brittle polymer. This polymer is of a low degree of polymerization.

High molecular weight film- and fiber-forming polymers can be prepared from the N-carboanhydrides of norvaline and norleucine. These polymers, especially the homopolymers, exhibit relatively high organic solvent resistance, making them especially useful in the formation of films and fibers destined for long-term exposure to organic solvents, such as for instance those normally used in the dry cleaning industry. Although these polyamides are of interest for their high organic solvent resistance, this same property makes them less easily adaptable to normally used techniques of film-casting and fiber-spinning from solution.

This invention has as an object the preparation of high molecular weight, film- and fiber-forming, alpha-amino acid polyamides. A further object is the preparation of high molecular weight, film- and fiber-forming polymers having high insolubility in a wide range of organic solvents, but having sufficient solubility in other solvents to allow their use in conventional film- and fiber-forming procedures and techniques. Another object is the preparation of N-carboanhydrides of alpha-amino acids suitable for the preparation of such polymers. Other objects will appear hereinafter.

These objects are accomplished by the invention of the N-carboanhydrides of alpha-amino-n-heptanoic and alpha-amino-n-octanoic (caprylic) acids and the high molecular weight, film- and fiber-forming polyamides prepared therefrom by condensation, with carbon dioxide evolution. These polymers exhibit relatively high insolubility in a rather wide range of organic solvents but are sufficiently soluble in other selected organic solvents to make them easily usable in normal film- and fiber-forming operations from solution.

The N-carboanhydrides of alpha-amino-n-heptanoic and alpha-amino-n-octanoic acids, i. e., the N-carboanhydrides of 7 and 8 carbon straight chain alpha-primary-aminoalkanoic acids, i. e., the N-carboanhydrides of aminoacetic acids carrying a 5 to 6 carbon straight chain hydrocarbon substituent on the alpha-carbon atom are characterized by ready solubility in dioxane, diethyl ether and benzene and easy recrystallizability from diethyl ether/petroleum ether mixtures. They are white, crystalline, low-melting solids (59–80° C.) which evolve gas at relatively low temperatures close to the melting point (90–108° C.).

The term "inherent viscosity," or $\eta_{inh.}$ as used herein is defined by the following equation:

$$\eta_{inh.} = \frac{ln \eta_{rel.}}{C}$$

wherein $ln$ represents the natural, or Napierian, logarithm, C is concentration of the solute in grams/100 cc. of solution and $$\eta_{rel.} = \frac{\eta \text{ solution}}{\eta \text{ solvent}}$$

$\eta$ being viscosity.

The following examples in which parts are by weight are illustrative of the invention.

EXAMPLE I

*Preparation of alpha-amino-n-heptanoic acid N-carboanhydride*

A suspension of 30 parts of alpha-amino-n-heptanoic acid in 620 parts of purified, anhydrous dioxane is prepared in a reactor open to the atmosphere through drying tubes and equipped with a reflux water condenser, a stirrer, and an inlet tube connected to a source of gaseous phosgene and so arranged that its lower extremity is just above the surface of the liquid. The suspension is heated to 49–51° C. with stirring and a stream of gaseous phosgene is passed into the reaction mixture over a period of 35 minutes at this temperature at such a rate that an excess of phosgene over the theoretical amount required is added. The resulting, clear, colorless solution is concentrated to approximately 12.5–15% of its volume through removal of most of the dioxane by distillation at 46–52° C. under reduced pressure (15–16 mm. of mercury) over a period of 70 minutes. The syrup remaining is extracted twice with 66 part portions of petroleum ether. The oil remaining is then dissolved in 35.4 parts of anhydrous diethyl ether and 145 parts of petroleum ether added to the cloud point. Upon cooling the resultant cloudy solution in ice and water until no further precipitate crystalizes and subsequently removing the white crystalline material by filtration there is obtained 19 parts (53.6% of theory) of slightly impure alpha-amino-n-heptanoic acid N-carboanhydride. An additional 5 parts of the slightly impure N-carboanhydride is isolated by concentrating the mother liquor from the previous crystallization under vacuum. These portions of the N-carboanhydride are combined and recrystallized from 71 parts of anhydrous diethyl ether and 86 parts of petroleum ether. After cooling the recrystallization solution until no further precipitate forms and removing the white crystalline material by filtration, there is thus obtained 19.5 parts (55% of theory) of the pure N-carboanhydride of alpha-amino-n-heptanoic acid as white needles melting at 59–60° C. and evolving gas at 108° C.

ANALYSIS

Calculated for $C_8H_{13}O_3N$: C, 56.14%; H, 7.60%; N, 8.18%. Found: C, 56.35%; H, 7.73%; N, 8.41%.

EXAMPLE II

*Preparation of the linear polyamide of alpha-amino-n-heptanoic acid*

Two parts of the above N-carboanhydride of alpha-amino-n-heptanoic acid dissolved in 88 parts of reagent benzene, containing water but in amount less than 0.02 per cent, is heated at 65° C. in a reactor open to the atmosphere through a small capillary tube for 93.6 hours. At the end of this time the solution, while still fluid, has become appreciably more viscous and exhibits a blue fluorescence. A portion of the polymerization solution is poured onto a glass casting surface and the benzene allowed to evaporate slowly at room temperature. There is thus obtained, after removal from the casting surface, a clear, self-supporting film of the polyamide of alpha-amino-n-heptanoic acid. This polyamide, while soluble in benzene as indicated, is insoluble in meta-cresol, chloroform, and 98–100% formic acid.

EXAMPLE III

*Preparation of alpha-amino-n-octanoic acid N-carboanhydride*

A suspension of 50 parts of alpha-amino-n-octanoic acid in 1033 parts of purified anhydrous dioxane is prepared in a reactor similar to the one described previously in Example I. The suspension is heated to 45–55° C. with stirring and a stream of gaseous phosgene is passed into the reaction mixture over a period of one hour at this temperature at such a rate that an excess of phosgene over the theoretical amount required is added. The reaction mixture is then pressure filtered through a sintered glass filter with nitrogen under anhydrous conditions. There is thus obtained 2.1 parts (3.4% recovery based on the starting amino acid) of alpha-amino-n-octanoic acid hydrochloride. The dioxane is removed from the clear filtrate by distillation at 45–55° C. under reduced pressure (5 mm. of mercury) over a period of 2.3 hours. The solid residue is dissolved in 424.8 parts of anhydrous diethyl ether and 325 parts of petroleum ether added. The resulting mixture is allowed to stand at room temperature for 0.5 hour, and the solid crystalline material that precipitates is removed by filtration. There is thus obtained 34 parts (58.5% conversion and 60.5% yield) of alpha-amino-n-octanoic acid N-carboanhydride. Thirty-four parts of this product is dissolved in 516.8 parts of anhydrous diethyl ether and 316.8 parts of petroleum ether added. The resulting solution is cooled to 0° C. and the solid product that precipitates is removed by filtration. There is thus obtained 21 parts (61.8% recovery) of pure alpha-amino-n-octanoic acid N-carboanhydride as a white, fluffy, crystalline solid melting at 78–80° C.

ANALYSIS

Calculated for $C_9H_{15}O_3N$: C, 58.4%; H, 8.1%. Found: C, 58.5%; H, 8.2%.

EXAMPLE IV

*Preparation of the linear polyamide of alpha-amino-n-octanoic acid*

Two parts of the above alpha-amino-n-octanoic acid N-carboanhydride are polymerized by heating in 44 parts of reagent grade benzene for three days at 65° C. in a reactor open to the atmosphere through a small capillary tube. The resulting, clear, viscous solution is poured in a thin film onto a glass plate and the benzene solvent allowed to evaporate at room temperature. After removal from the casting surface there is obtained a clear film of the polyamide of alpha-amino-n-octanoic acid. This polyamide is almost completely soluble in chloroform and insoluble in meta-cresol and formic acid. It is cold-drawable and exhibits at the break a tensile strength of 1283 lb./sq. in. and 46% elongation.

EXAMPLE V

*Preparation of the copolyamide from a 1:1 by weight mixture of the N-carboanhydrides of alpha-amino-n-octanoic acid and DL-leucine*

A mixture of equal parts of the N-carboanhydrides of alpha-amino-n-octanoic acid and DL-leucine is polymerized by heating in 44 parts of reagent grade benzene for six days at 65° C. in a reactor open to the atmosphere through a small capillary tube. At the end of this time 37.2 parts of chloroform is added to the clear viscous polymer solution. The resulting solution is thoroughly mixed by gentle warming and stirring and subsequently flowed in a thin film onto a glass plate and the solvents allowed to evaporate at room temperature. After removal from the casting surface there is obtained a clear, strong film of the copolyamide from a 1:1 by weight mixture of the N-carboanhydrides of alpha-amino-n-octanoic acid and DL-leucine. This film is readily soluble in meta-cresol and chloroform. It is orientable, drawing about 200% at 240° C. to give a much stronger film. The inherent viscosity of the copolyamide at 0.1% and 0.3% concentrations (i. e., 0.1 g./100 cc. of solution and 0.3 g./100 cc. of solution) in meta-cresol is 0.88 and 0.89, respectively.

EXAMPLE VI

*Preparation of the copolyamide from a 1:1 by weight mixture of the N-carboanhydrides of alpha-amino-n-octanoic acid and alpha-amino-n-butyric acid*

A mixture of equal parts of the N-carboanhydrides of alpha-amino-n-octanoic acid and alpha-amino-n-butyric acid is dissolved in 66 parts of reagent grade benzene and heated at 65° C. for six days in a reactor open to the atmosphere only through a capillary tube. During the polymerization the copolyamide in the form of gel separates from solution. The copolyamide is subsequently isolated by allowing the benzene to evaporate at room temperature from a thin film of the polymerization mixture poured onto a glass plate. There is thus obtained the copolyamide from a 1:1 by weight mixture of N-carboanhydrides of alpha-amino-n-octanoic acid and alpha-amino-n-butyric acid. This copolyamide is insoluble in meta-cresol, benzene, and chloroform.

Although in the foregoing examples certain conditions of reaction such as time, temperature, proportions, etc. have been given for the preparation of the novel N-carboanhydrides of this invention it is to be understood that other methods known in the art for preparing N-carboanhydrides can also be used. Thus, the N-carboanhydrides of this invention can be prepared, as is disclosed in the copending application of Prichard, filed October 7, 1947, Ser. No. 778,457, by treating an alpha-amino acid in an anhydrous solvent with an alkali metal alkoxide and with carbon dioxide thereby forming the dialkali metal salt of the alpha-carboxyaminocarboxylic acid and reacting thionyl chloride with this salt and isolating the desired N-carboanhydride. The novel N-carboanhydrides of this invention can also be prepared, as is disclosed in the copending application of MacDonald, filed March 24, 1949, Ser. No. 83,299, by reacting the requisite amino acid or its alkali metal or alkaline earth metal salts with phosgene under anhydrous conditions. The novel N-carboanhydrides of this invention also can be prepared by the method disclosed in the copending application of Prichard, filed October 5, 1948, Ser. No. 52,971, by reacting the requisite amino acid or its alkali metal, alkaline earth metal, or hydrohalide salts with phosgene under anhydrous conditions and in the presence of an ether, as is illustrated by Examples I and III.

The novel N-carboanhydrides of this invention can also be prepared from the corresponding amino acids as reported by Leuchs, Ber 39, 857 (1906), by reacting the amino acid with a chloroformate ester, isolating the ester of the N-carboxyamino acid so formed and subsequently reacting this derivative with thionyl chloride under anhydrous conditions and isolating the desired N-carboanhydrides.

The present invention is generic to the N-carboanhydrides of alpha-primary-amino acids of the following type formula:

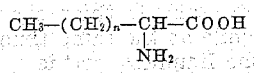

wherein $n$ is an integer of from 4 to 5. Of these N-carboanhydrides that form the amino acid of the above-given formula wherein $n$ is 5, i. e., alpha-amino-n-octanoic acid, is preferred since the amino acid and also the N-carboanhydride are preparable from a readily available intermediate, namely, n-heptaldehyde which is available in good yields by the destructive distillation of castor oil under reduced pressure (see page 247, Whitmore, "Organic Chemistry," Van Nostrand, 1937). This N-carboanhydride is also preferred since the polyamides prepared therefrom are in general somewhat more soluble, especially in benzene and chloroform, than the corresponding products from the alpha-amino-n-heptanoic acid making them easier to handle in conventional procedures. Furthermore, polyamides prepared from this preferred N-carboanhydride are in general slightly superior in physical properties such as tensile strength and elongation and in addition more easily obtained in higher molecular weights as evidenced by the fact that they are more readily cold-drawable, i. e., orientable.

This invention is also generic to the polymers from the above-mentioned N-carboanhydrides. These polymers are linear condensation polyamides and consist of recurring alpha-primary monoaminomonocarboxylic acid units 10 to 100% of which are units of the following formula

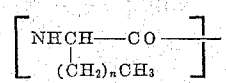

wherein $n$ is an integer of from 4 to 5.

When at least 10% of the recurring units of the polyamides of this invention are composed of the residues of amino acids of the above-given formula, improvements over the corresponding polymers containing less than 10% of the residues of amino acids of the above-given type formula are noted in the above-mentioned combination of unique properties, i. e., relatively high insolubility in a rather wide range of organic solvents, but sufficient solubility in other selected organic solvents to permit easy usage in normal film- and fiber-forming operations from solution, relatively high thermal resistance, desirable softness and pliability coupled with adequate tensile strength and resistance to marring. For instance, polyamides from the straight-chain alpha-primary-monoaminomonocarboxylic acids containing 5 and 6 carbon atoms, i. e., norvaline and norleucine, are highly resistant to most organic solvents especially in the cases of the homopolymers. Conversely, polyamides from the straight-chain alpha-primary-monoaminomonocarboxylic acids containing 12 and 14 carbon atoms, i. e., alpha-aminolauric and alpha-aminomyristic acids, are easily soluble in organic solvents, even in such typical non-solvents for alpha-amino acid polyamides as diethyl ether and petroleum ether. The polyamides of this invention are generally soluble in benzene or chlorobenzene in sufficient concentrations to allow the preparation of films and fibers and are variously insoluble in m-cresol, chloroform, formic acid and other good organic solvents. The polyamides of this invention are softer and more pliable in general than the alpha-amino acid polyamides from branched-chain alpha-primary monoaminomonocarboxylic acids, for instance, synthetic, optically-inactive alpha-aminoisocaproic acid. They are also generally resistant to temperatures as high as 350° C. exhibiting no melting and only slight browning, whereas polyamides from alpha-aminolauric and alpha-aminomyristic acids exhibit stick temperatures in the range 250–260° C. and melt with decomposition above 325–330° C.

As the proportion of the residues of amino acid of this type in the polymers of this invention increases there is a corresponding increase in the above-mentioned desirable properties. This becomes particularly noticeable when the polymers contain a major proportion, i. e., more than 50% and preferably more than 70% of units of the above described amino acids.

In the case of copolymers containing the residues of other types of alpha-amino acids there will be, of course, additional units in the polymer chain. However, upon hydrolysis with hydrochloric acid, all polymers of this invention yield a hydrolysis product consisting of alpha-amino carboxylic acids (as the hydrochlorides) at least 10% of which consists of at least one alpha-primary-monoaminomonocarboxylic acid of the general formula

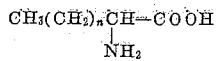

wherein $n$ is an integer from 4 to 5.

The N-carboanhydrides of this invention, of the formula

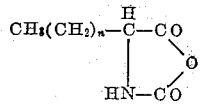

where $n$ is an integer from 4 to 5, may be copolymerized with the N-carboanhydride of any alpha-monoaminomonocarboxylic acid including, in addition to those specified above, alpha-primary aminoalkanoic acids, e. g. alanine, isoleucine, alpha-methyl-alpha-amino-n-butyric acid, glycine, alpha-aminolauric acid, alpha-aminomyristic acid, alpha-aminoisobutyric acid, 2-amino-4,6,6-trimethylheptanoic acid; cycloaliphatic alpha-primary aminocarboxylic acids, e. g. 1-aminocyclopentanecarboxylic acid, 1-aminocyclohexanecarboxylic acid, 1-amino-cycloheptanecarboxylic acid; hydrocarbon-substituted alpha-primary aminoalkanoic acids, e. g. phenylalanine; N-aryl-substituted alpha-secondary aminocarboxylic acids, e. g. N-phenylglycine; N-alkyl-substituted alpha-secondary aminocarboxylic acid, e. g. N-methylglycine, N-isopropylleucine.

The polyamides and copolyamides of this invention are prepared, optionally in the presence of inert organic liquids (particularly those free from active hydrogen), by the condensation-polymerization with carbon dioxide evolution (initiated thermally or by water, alcohols, phenols, organic acids, or amino hydrogen-containing amines) of the previously defined alpha-amino acid N-carboanhydrides. Suitable organic liquids that can be used include aromatic hydrocarbons, e. g., benzene, xylene; halogenated hydrocarbons, e. g., chloroform, chlorobenzene, carbon tetrachloride; alicyclic ketones, e. g., cyclohexanone; and ethers, e. g., anisole or dibutyl ether.

The N-carboanhydrides are suitably heated, in a vessel adapted to permit the escape of carbon dioxide, to that temperature at which carbon dioxide begins to be evolved at an appreciable rate under the conditions of reaction. This varies with different amino acids but it is usually in the range of from 25 to 200° C. and generally within 30–50° C. of the melting point of the lowest melting N-carboanhydride present in the mixture to be polymerized. The time of the reaction can be shortened or the temperature can be lowered or both can be accomplished by the use of reaction initiators, e. g., water, alcohols, phenols, organic acids, or amino hydrogen-containing amines. Heating at 65° C. for 24 to 144 hours is effective. Temperatures of 130–200° C. are used when no solvent is employed.

The polyamides and copolyamides of this invention can be used to produce films and fibers. They also can be used in molding and coating compositions. These polyamides are suitable in one or more of the following uses; sutures, bandages, wrapping foils and the like.

The polyamides of this invention are characterized by a unique combination of properties, as above indicated. They differ markedly from other alpha-amino acid polyamides previously known in the art. For instance, alpha-amino acid polyamides containing norvaline and norleucine units form rather stiff films and fibers, tending to be brittle and to exhibit a hard, glossy, slippery finish. In contrast, the polyamides of this invention, i. e., those containing more than 10% and preferably more than 50% combined alpha-amino-n-heptanoic and/or alpha-amino-n-octanoic acid residues, form films and fibers which are noticeably more pliable and whose surface is softer and less glossy.

Furthermore, the polyamides from shorter branched chain alpha-amino acids, e. g., alpha-aminoisocaproic acid, as disclosed in the copending application of Cleaver and Schreiber, filed January 19, 1949, Ser. No. 71,756, although exhibiting excellent strength and toughness, are not as soft and pliable as is desired. The polyamides of this invention although not as strong as the polyamides from shorter, branched chain alpha-amino acids, are appreciably softer and more pliable—properties much desired for the preparation of films and fabrics of good feel and hand.

The polyamides from the shorter chain alpha-amino acids, as discussed, for example, in the above-identified application of Cleaver and Schreiber and in the various copending applications of MacDonald previously mentioned in this specification, while tough and strong, not only tend to be somewhat brittle but also are markedly lacking in elongation and extensibility properties, e. g. tensile strengths of 6000–7000 lb./sq. in. and elongations of 5–25%, and as high as 50%. On the other hand, the polyamides of this invention exhibit appreciably higher elongation properties, i. e., they can be stretched to a greater degree without any loss of tensile strength while still being able to return to their original dimensions, i. e., they are not permanently set, e. g. tensile strengths of 1500–3000 lb./sq. in. and elongations of 50–100%, and as high as 200%.

The polyamides from long-chain alpha-amino acids, e. g., alpha-aminolauric and alpha-aminomyristic acids while exceeding the polyamides of this invention in their limpness, pliability and extensibility are markedly deficient in strength and toughness. In fact, they are relatively so weak and so soft, even to the extent of being surface marable, that they cannot be used in any of the normal film and fiber outlets. However, the polyamides of this invention are strong enough, tough enough and hard enough to make them usable in the preparation of films and fibers, while at the same time, they exhibit enough of the limpness, softness, pliability and high extensibility of the polyamides from the longer chain alpha-amino acids to make them particularly useful in outlets requiring these properties.

The polyamides of this invention thus possess an unexpected combination of the desirable properties of the polyamides from several other different types of alpha-amino acids. They exhibit a unique balance of pliability, extensibility, strength, stiffness, toughness—all properties much desired for the production of films and fibers which are strong, pliable, resilient and of good feel and hand.

In the preceding specification and in the following claims "unit" as applied to alpha-monoaminomonocarboxylic acids refers to the portion of said acid remaining after removal of an aminohydrogen and the carboxyl hydroxyl and can be conveniently represented by the general structural formula $$\left[ \begin{array}{c} H\ H\ O \\ -N-C-C- \\ R \end{array} \right]$$

wherein R is—$(CH_2)_nCH_3$ and N is 4 or 5.

The foregoing detailed description has been given for clearness of understanding only and no unnecessary limitations are to be understood therefrom. The invention is not limited to the exact details shown and described for obvious modifications will occur to those skilled in the art.

What is claimed is:

1. The N-carboanhydride of an alpha-amino-n-alkanoic acid of 7 to 8 carbon atoms.

2. The N-carboanhydride of alpha-amino-n-heptanoic acid.

3. The N-carboanhydride of alpha-amino-n-octanoic acid.

4. A linear polyamide the recurring units of which are alpha-monoaminomonocarboxylic acid units at least 10% of which are units of the formula $$-NH-CH-CO- \\ \ \ \ \ \ \ \ \ \ \ \ (CH_2)_nCH_3$$

wherein $n$ is an integer from 4 to 5.

5. A linear polyamide the recurring units of which are alpha-monoaminomonocarboxylic acid units consisting of an aminocarboxylic acid minus an aminohydrogen and a carboxyl hydroxyl of which units at least 10% are aminocarboxylic acid units of the formula $$-NH-CH-CO- \\ \ \ \ \ \ \ \ \ \ \ \ (CH_2)_nCH_3$$

wherein $n$ is an integer from 4 to 5.

6. A linear polyamide the recurring units of which are alpha-monoaminomonocarboxylic acid units consisting of an aminocarboxylic acid minus an aminohydrogen and a carboxyl hydroxyl of which units at least 10% are aminocarboxylic acid units of the formula $$NH-CH-CO- \\ \ \ \ \ \ \ \ \ \ \ (CH_2)_4CH_3$$

7. A linear polyamide the recurring units of which are alpha-monoaminomonocarboxylic acid units consisting of an aminocarboxylic acid minus an aminohydrogen and a carboxyl hydroxyl of which units at least 10% are aminocarboxylic acid units of the formula $$NH-CH-CO- \\ \ \ \ \ \ \ \ \ \ \ (CH_2)_5CH_3$$

CHARLES W. TULLOCK.

REFERENCES CITED

The following references are of record in the file of this patent:

UNITED STATES PATENTS

| Number | Name | Date |
|---|---|---|
| 2,293,388 | Hanford | Aug. 18, 1942 |
| 2,327,162 | Baldwin et al. | Aug. 17, 1943 |
| 2,333,752 | Ufer | Nov. 9, 1943 |
| 2,352,152 | Kaplan | June 20, 1944 |
| 2,534,283 | MacDonald | Dec. 19, 1950 |

OTHER REFERENCES

Astbury et al., Nature, Oct. 16, 1948, vol. 162, page 596.